May 11, 1937.  J. B. FAIRBANKS ET AL  2,080,171
COOKING UTENSIL
Filed June 16, 1936
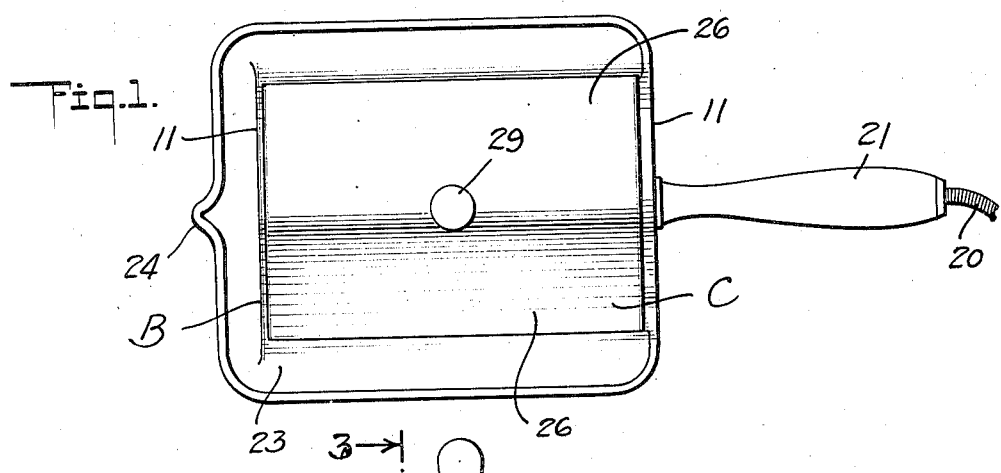
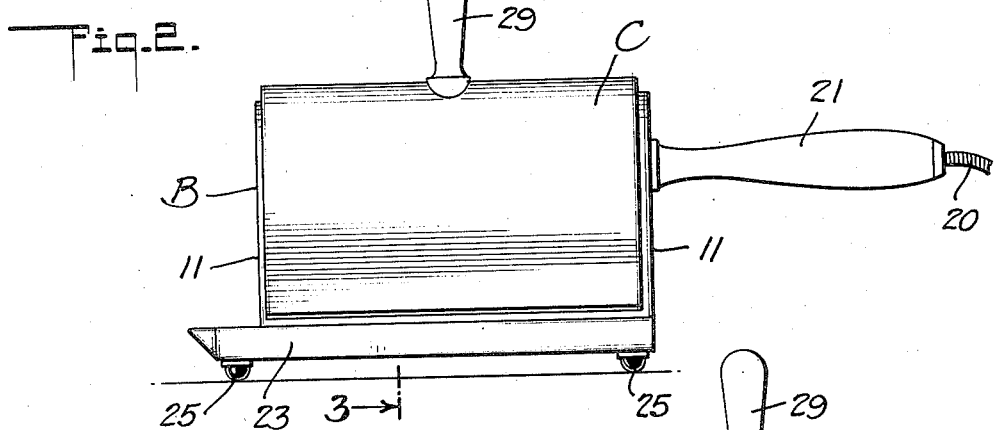
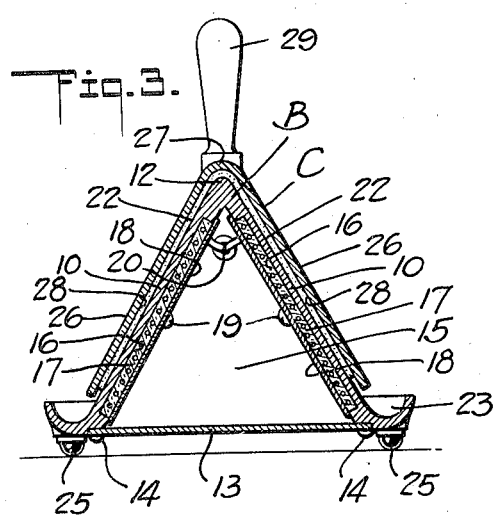
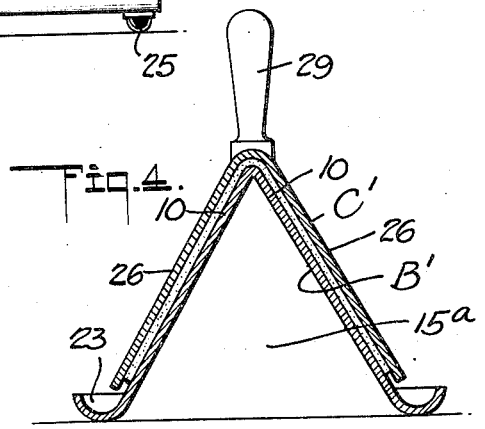
INVENTORS
JERRY B. FAIRBANKS
BY ROBERT W. CARLISLE
Anderson + Liddy
ATTORNEYS Patented May 11, 1937

2,080,171

UNITED STATES PATENT OFFICE 2,080,171

COOKING UTENSIL

Jerry B. Fairbanks and Robert W. Carlisle, Los Angeles, Calif.

Application June 16, 1936, Serial No. 85,456

13 Claims. (Cl. 53—5)

This invention relates to and has for an object the provision of a cooking utensil particularly adapted although not necessarily for the cooking of bacon, and structurally characterized by its capability of uniformly cooking the bacon while automatically draining and collecting the rendered grease therefrom during the cooking operation, so that the cooking will be practically smokeless; and its capability of thoroughly cooking the bacon without the necessity of turning the bacon during the cooking operation, as well as maintaining the bacon flat so that the bacon is rendered more suitable for use in sandwiches.

With this and other objects in view, the invention consists in the combinations and arrangements of elements as set forth in the following specification and particularly pointed out in the appended claims.

In the accompanying drawing,

Figure 1 is a view showing-in plan one form of cooking utensil embodying this invention;

Figure 2 is a view of the cooking utensil in side elevation;

Figure 3 is a vertical sectional view taken on the line 3—3 of Figure 2;

Figure 4 is a view similar to Figure 3 and showing a modified form of cooking utensil.

Referring specifically to the drawing, the invention comprises a body B and a cover C therefor both of aluminum or other suitable metal preferably of high heat conductivity. The body B is generally rectangular in plan and is composed of relatively inclined side walls 10—10, connected at their ends by integral end walls 11—11. The side walls are thus vertically disposed to specifically converge upwardly to an approximate apex which may be rounded off as indicated at 12. Recessed into the lower edges of the walls 10—10 and 11—11 so as to span the walls is a bottom wall 13 removably secured in place by screws 14 or other fastening members so as to co-act with the other walls in providing a closed heating chamber 15.

The inner surfaces of the walls 10—10 are recessed at 16—16 to receive suitable electrical heating elements 17—17 confined in place by cover plates 18 through which pass screws 19 to secure such plates to the walls. Current can be supplied to the heating elements from a suitable domestic source by a conductor 20 connected in circuit with the elements and preferably extending out of the chamber 15 through a hollow handle 21 constructed of heat insulating material and rigidly secured to one of the end walls 11 in any suitable manner.

The outer sides of the walls 10—10 are flat and provide cooking surfaces 22—22 over which slices of bacon to be cooked can be draped so as to be supported substantially medially between their ends from the rounded apex portion 12, the walls 10—10 being of such height as to accommodate more than half of the length of a strip of bacon.

At their lower edges, the walls 10—10 and that one of the walls 11 opposite the handle 21 terminate in a trough 23 which thus extends around three sides of the base of the body and is provided medially between that portion along the wall 11, with a pouring spout 24. Suitable feet 25 of heat insulating material are fastened to the underside of the body at the corners thereof to support the body elevated from a table or other support The cover C comprises relatively inclined walls 26—26 converging to a rounded apex 27, with their angular relationship corresponding to that of the body walls 10—10, and having their inner sides flat to provide cooking and pressing surfaces 28—28. In the applied position of the cover, the surfaces 28 confine the strips of bacon flatly on the cooking surfaces 10 under the weight of the cover which is sufficient for this purpose. At the rounded apex portion 27 and medially between its ends the cover is provided with a vertical handle 29 of suitable insulating material.

In operation, and with the body B heated by the elements 17, the strips of bacon to be cooked are draped over the apex portion 12 to extend approximately equally in two stretches down the walls 10—10 so as to be supported against displacement.

The cover is now placed on the body to overlie the strips of bacon and maintain the latter flat against the usual tendency to curl and crinkle during the cooking operation.

As the cooking operation proceeds, it will be appreciated that the heat of the body will be conducted to the cover and will also be confined by the chamber 15 so as to reduce heat losses to a minimum. Thus the bacon will be cooked uniformly from both sides without the necessity of turning the bacon, the rendered grease rapidly draining by gravity from the bacon into the trough 23 from which the grease can be conveniently poured as desired through the spout 24.

As the rendered grease is immediately separated from the bacon, the cooking operation will be practically smokeless and the flavor of the bacon improved. As the strips of bacon will be flat when the cooking operation is completed, they are rendered more suitable for use in sandwiches.

Reference will now be had to Figure 4, wherein a modified form of cooking utensil is shown and is particularly adapted for heating when placed on a cooking range over a burner thereof. In construction, this form of utensil includes a cover C' identical to the cover C, and a body B' which differs from the body B only to the extent of omitting the heating elements 17, the insulating bottom wall 13, and the feet 25. The heating chamber 15a provided by the side and end walls of the body is thus open at the bottom to receive and confine the flames and/or heat from the burner over which the body B' is placed for the cooking operation which is the same as described in conjunction with the first form of the invention

What is claimed is:

1. A utensil for cooking strips of bacon comprising means defining relatively inclined flat cooking surfaces converging to an approximate apex and exposed to receive strips of bacon which can be draped to extend lengthwise from the apex downwardly along in contact with the surfaces for cooking when the utensil is heated; and means for collecting rendered grease draining by gravity from said surfaces during the cooking operation.

2. A cooking utensil having relatively inclined flat cooking surfaces converging to an approximate apex over which strips of bacon can be draped to extend lengthwise from the apex downwardly along the surfaces for cooking when the utensil is heated; a cover having flat surfaces complementary to the aforestated surfaces for co-action therewith in confining the strips of bacon against crinkling and curling during the cooking operation; and means for collecting rendered grease draining by gravity from said surfaces during the cooking operation.

3. A cooking utensil having relatively inclined flat cooking surfaces converging to an approximate apex over which strips of bacon can be draped to extend lengthwise from the apex downwardly along the surfaces for cooking when the utensil is heated; a cover having flat cooking and pressing surfaces co-acting with the aforestated surfaces to confine the strips of bacon flatly between said surfaces during the cooking operation; and means for collecting rendered grease draining by gravity from the surfaces during the cooking operation.

4. A cooking utensil having opposed vertical cooking surfaces over which articles of food can be draped to extend down each of the surfaces and be supported thereon for cooking when the utensil is heated; a cover for confining the articles of food flatly on said surfaces against curling during the cooking operation and means for collecting any liquid from the articles of food draining by gravity from said surfaces during the cooking operation.

5. A cooking utensil having opposed vertical cooking surfaces over which articles of food can be draped to extend down each of the surfaces and be supported thereon for cooking when the utensil is heated; a cover having surfaces complementary to and co-acting with the aforestated surfaces to confine the articles of food flatly between the surfaces during the cooking operation; and means for collecting any liquid from the articles of food draining by gravity from said surfaces during the cooking operation.

6. A cooking utensil comprising a hollow body having side and end walls co-acting to define a heating chamber in the body with the side walls converging upwardly to provide relatively inclined exterior cooking surfaces over which strips of bacon can be draped to extend downwardly in contact with said surfaces for cooking when the body is heated; means with which the cooking surfaces can co-act to confine the strips of bacon flatly thereon against curling during the cooking operation and means defining a trough on the body disposed to receive and collect rendered grease draining by gravity from said surfaces during the cooking operation.

7. A cooking utensil comprising a hollow body having side and end walls co-acting to define a heating chamber in the body with the side walls converging upwardly to provide relatively inclined exterior cooking surfaces over which strips of bacon can be draped to extend downwardly in contact with said surfaces for cooking when the body is heated; a cover having surfaces complementary to and co-acting with the aforestated surfaces to confine the articles of food flatly between the surfaces during the cooking operation; and means defining a trough on the body disposed to receive and collect rendered grease draining by gravity from said surfaces during the cooking operation.

8. A cooking utensil comprising a hollow body having side and end walls co-acting to define a heating chamber in the body with the side walls converging upwardly to provide relatively inclined exterior cooking surfaces over which strips of bacon can be draped to extend downwardly in contact with said surfaces for cooking when the body is heated; means defining a trough extending around at least the sides and one end of the body with a pouring spout at said end; and a handle projecting from the other end of the body.

9. A cooking utensil comprising a hollow body having side and end walls co-acting to define a heating chamber in the body with the side walls converging upwardly to provide relatively inclined exterior cooking surfaces over which strips of bacon can be draped to extend downwardly in contact with said surfaces for cooking when the body is heated; means for closing the bottom of the heating chamber; electrical heating elements in said chamber and correlated with the side walls to heat same when current is supplied to said elements; and means defining a trough in which rendered grease draining by gravity from said surfaces during the cooking operation may collect.

10. A cooking utensil comprising a hollow body having side and end walls co-acting to define an open bottomed heating chamber in the body for heating of the latter when placed over a heat source; said side walls converging upwardly to provide relatively inclined exterior cooking surfaces over which strips of bacon can be draped to extend downwardly on the surfaces for cooking when the body is heated; and a trough on the body in which rendered grease draining by gravity down said surfaces is collected.

11. A utensil for cooking strips of bacon comprising means defining flat and smooth cooking surfaces relatively converging upwardly to an approximate apex, and exposed to directly receive strips of bacon which can be draped over the surfaces to rest thereon for cooking when the utensil is heated; the combined vertical dimensions of said surfaces being at least equal to the length of a strip of bacon so as to enable the latter to be supported throughout its length by said surfaces.

12. A cooking utensil having cooking surfaces relatively converging upwardly to an approximate apex, and over which strips of bacon can be draped for cooking when the utensil is heated; the combined vertical dimensions of said surfaces being at least equal to the length of a strip of bacon so as to enable the latter to be supported throughout its length by said surfaces; and a cover having surfaces complementary and substantially co-extensive in vertical dimensions to the aforestated surfaces to co-act therewith in confining strips of bacon flatly between the surfaces during the cooking operation.

13. A cooking utensil having cooking surfaces relatively converging upwardly to an approximate apex, and over which elongated articles of food to be cooked can be draped to extend lengthwise down said sides from said apex; the combined vertical dimensions of said surfaces being at least equal to the length of the article so as to enable the latter to be supported throughout its length in contact with said surfaces; and means co-acting with the cooking surfaces to confine the articles of food flatly thereon against crinkling and curling during the cooking operation.

JERRY B. FAIRBANKS.
ROBERT W. CARLISLE.